United States Patent
Ninan et al.

(10) Patent No.: US 9,860,169 B1
(45) Date of Patent: Jan. 2, 2018

(54) NEIGHBOR RESOLUTION FOR REMOTE EVPN HOSTS IN IPV6 EVPN ENVIRONMENT

(71) Applicant: Juniper Networks, Inc., Sunnyvale, CA (US)

(72) Inventors: Samson P Ninan, Bangalore (IN); Sushant Kumar, Bangalore (IN); Reji Thomas, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 169 days.

(21) Appl. No.: 14/869,299

(22) Filed: Sep. 29, 2015

(51) Int. Cl.
  *H04L 12/741* (2013.01)
  *H04L 12/54* (2013.01)
  *H04L 12/66* (2006.01)
  *H04W 40/34* (2009.01)

(52) U.S. Cl.
  CPC .............. *H04L 45/74* (2013.01); *H04L 12/56* (2013.01); *H04L 12/66* (2013.01); *H04W 40/34* (2013.01)

(58) Field of Classification Search
  None
  See application file for complete search history.

(56) References Cited

U.S. PATENT DOCUMENTS

| | | | | |
|---|---|---|---|---|
| 9,559,951 | B1* | 1/2017 | Sajassi | ..................... H04L 45/66 |
| 2007/0260746 | A1* | 11/2007 | Mirtorabi | ................ H04L 12/66 |
| | | | | 709/238 |
| 2008/0170578 | A1* | 7/2008 | Ould-Brahim | ...... H04L 12/4641 |
| | | | | 370/401 |
| 2010/0008361 | A1* | 1/2010 | Guichard | ................ H04L 45/00 |
| | | | | 370/392 |
| 2012/0023242 | A1* | 1/2012 | Pirbhai | ............. H04L 29/12028 |
| | | | | 709/228 |
| 2013/0230049 | A1* | 9/2013 | Zeng | ..................... H04L 45/745 |
| | | | | 370/392 |

OTHER PUBLICATIONS

Rosen et al., "BGP/MPLS IP Virtual Private Networks," RFC 4364, Feb. 2006, 47 pp.
Narten, et al., "Neighbor Discovery for IP version 6 (IPv6)," RFC 4861, Sep. 2007, 97 pp.

(Continued)

*Primary Examiner* — Kodzovi Acolatse
(74) *Attorney, Agent, or Firm* — Shumaker & Sieffert, P.A.

(57) ABSTRACT

The techniques described herein may enable a particular PE router configured in an EVPN to share, rather than immediately discard, a CE router MAC address that is included in an IPv6 neighbor advertisement even though the particular PE router does not include a neighbor cache entry corresponding to the CE router. The techniques may include receiving, from a CE router that is locally coupled to the first PE router, an IPv6 neighbor advertisement from the CE router in response to an IPv6 neighbor solicitation from a second PE router that requested a MAC address of the CE router; determining whether an L2 destination addresses of the IPv6 neighbor advertisement match the L2 address of the bridging interface second PE router; and in response to determining a match, sending, to the second PE router, an EVPN route advertisement specifying at least the MAC address of the CE router.

20 Claims, 5 Drawing Sheets

(56) References Cited

OTHER PUBLICATIONS

Sajassi et al., "BGP MPLS-Based Ethernet VPN," RFC 7432, Feb. 2015, 56 pp.
Sajassi et al., "Integrated Routing and Bridging in EVPN draft-ietf-bess-evpn-inter-subnet-forwarding-00," Nov. 11, 2014, 26 pp.
Rabadan et al., "IP Prefix Advertisement in EVPN draft-ietf-bess-evpn-prefix-advertisement-01," Mar. 9, 2015, 24 pp.
Sajassi et al., "E-VPN and IP-VPN Integrated Solution draft-sajassi-l2vpn-ipvpn-interop-02," Oct. 21, 2013, 16 pp.

\* cited by examiner

NEIGHBOR RESOLUTION FOR REMOTE EVPN HOSTS IN IPV6 EVPN ENVIRONMENT

TECHNICAL FIELD

The invention relates to computer networks and, more specifically, to forwarding network traffic within computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via the intermediate network. In a typical configuration, provider edge (PE) network devices (e.g., routers and/or switches) coupled to the customer edge (CE) network devices of the customer networks define label switched paths (LSPs) (also referred to as pseudowires) within the provider network to carry encapsulated L2 communications as if these customer networks were directly attached to the same local area network (LAN). In some configurations, the PE network devices may also be connected by an IP infrastructure in which case IP/GRE tunneling or other IP tunneling can be used between the network devices.

In an EVPN, MAC learning between PE network devices occurs in the control plane rather than in the data plane (as happens with traditional bridging) using a routing protocol. For example, in EVPNs, a PE network device typically uses the Border Gateway Protocol (BGP) (i.e., an L3 routing protocol) to advertise to other provider edge network devices the MAC addresses learned from the local consumer edge network devices to which the PE network device is connected. A PE device may use BGP route advertisement message to announce reachability information for the EVPN, where the BGP route advertisement specifies one or more MAC addresses and/or IP addresses learned by the PE network device instead of L3 routing information.

In an EVPN configuration referred to as all-active mode, an Ethernet segment includes multiple PE network devices that provide multi-homed connectivity for one or more local customer network devices. Moreover, the multiple PE network device provide transport services through the intermediate network to a remote PE network device, and each of the multiple PE network devices in the Ethernet segment operates forwards Ethernet frames in the segment for the customer network device. If a PE network device requires a link-layer (e.g., MAC address) of another network device, the PE network device may send a request to the network device for the address. However, the response from the network device with the address may not reach the requesting PE network device.

SUMMARY

The techniques described herein enable a particular PE router configured in an EVPN to share with other routers of the EVPN, rather than immediately discard, a Customer Edge (CE) router MAC address that is included in an IPv6 neighbor advertisement even though the particular PE router does not include a neighbor cache entry corresponding to the CE router. For instance, the CE router may be directly coupled to the particular PE router, and the CE router may receive an IPv6 neighbor solicitation from another PE router in the EVPN. In response, the CE router may output a corresponding neighbor advertisement, which may be forwarded first to the particular PE router rather than the requesting PE due to load-balancing network traffic in the EPVN or because the particular PE router is on the same subnet as the CE router, which may be a different subnet than the requesting PE router that initially sent the neighbor solicitation.

In accordance with the techniques described herein, rather than immediately discarding the neighbor advertisement, as defined by section 7.2.5 by RFC 4861, because the particular PE router did not originate the IPv6 neighbor solicitation, the particular PE router may instead analyze the neighbor advertisement and determine whether the destination MAC and/or IP address within a header of the neighbor advertisement matches a MAC and/or IP address of the other PE router that previously exchanged EVPN messages with the particular PE router during initial EVPN configuration. If a match exists, the particular PE router may send the MAC address to the other PE router that initially sent the neighbor solicitation. In this way, rather than immediately discarding the neighbor advertisement because the particular PE router itself did not include a neighbor cache entry indicating it originated solicitation of the CE router's MAC address, as defined by section 7.2.5 by RFC 4861, the particular PE router may share (e.g., forward via an EVPN message) the MAC address or MAC address/IP address combination to the other PE router that initially sent the neighbor solicitation to the CE router. As such the other PE router is able to learn the MAC address and forward network traffic to the CE router even though the particular PE router, rather than the other PE that originated the IPv6 neighbor solicitation to the CE, received the neighbor advertisement from the CE router in response to the IPv6 neighbor solicitation.

In some examples, a method includes: receiving, by a first provider edge (PE) router and from a second PE router when establishing an Ethernet Virtual Private Network (EVPN) with the first PE router and the second PE router, a layer two (L2) address and an Internet Protocol version 6 (IPv6) address associated with a bridging interface of the second PE router for use with the EVPN; receiving, by the first PE router and from a CE router that is locally coupled to the first PE router, an IPv6 neighbor advertisement from the CE router that is sent by the CE router in response to an IPv6 neighbor solicitation from the second PE router that requested a MAC address of the CE router; determining, by the first PE router, whether an L2 destination addresses of the IPv6 neighbor advertisement match the L2 address of the bridging interface second PE router; and in response to determining a match, sending, by the first PE router and to the second PE router, an EVPN route advertisement specifying at least the MAC address of the CE router.

In some examples, a first provider edge (PE) router includes a routing engine, wherein the routing engine: receives, from a second PE router when establishing an Ethernet Virtual Private Network (EVPN) with the first PE router and the second PE router, a layer two (L2) address and an Internet Protocol version 6 (IPv6) address associated with a bridging interface of the second PE router for use with the EVPN; receives, from a CE router that is locally coupled to the first PE router, an IPv6 neighbor advertisement from the CE router that is sent by the CE router in response to an IPv6 neighbor solicitation from the second PE router that requested a MAC address of the CE router; determines whether an L2 destination addresses of the IPv6 neighbor advertisement match the L2 address of the bridging interface second PE router; and in response to determining a match, sends, to the second PE router, an EVPN route advertisement specifying at least the MAC address of the CE router.

In some examples, a computer-readable medium comprising instructions for causing at least one programmable processor of a first provider edge (PE) router to: receive, from a second PE router when establishing an Ethernet Virtual Private Network (EVPN) with the first PE router and the second PE router, a layer two (L2) address and an Internet Protocol version 6 (IPv6) address associated with a bridging interface of the second PE router for use with the EVPN; receive, from a CE router that is locally coupled to the first PE router, an IPv6 neighbor advertisement from the CE router that is sent by the CE router in response to an IPv6 neighbor solicitation from the second PE router that requested a MAC address of the CE router; determine whether an L2 destination addresses of the IPv6 neighbor advertisement match the L2 address of the bridging interface second PE router; and in response to determining a match, send, to the second PE router, an EVPN route advertisement specifying at least the MAC address of the CE routers.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
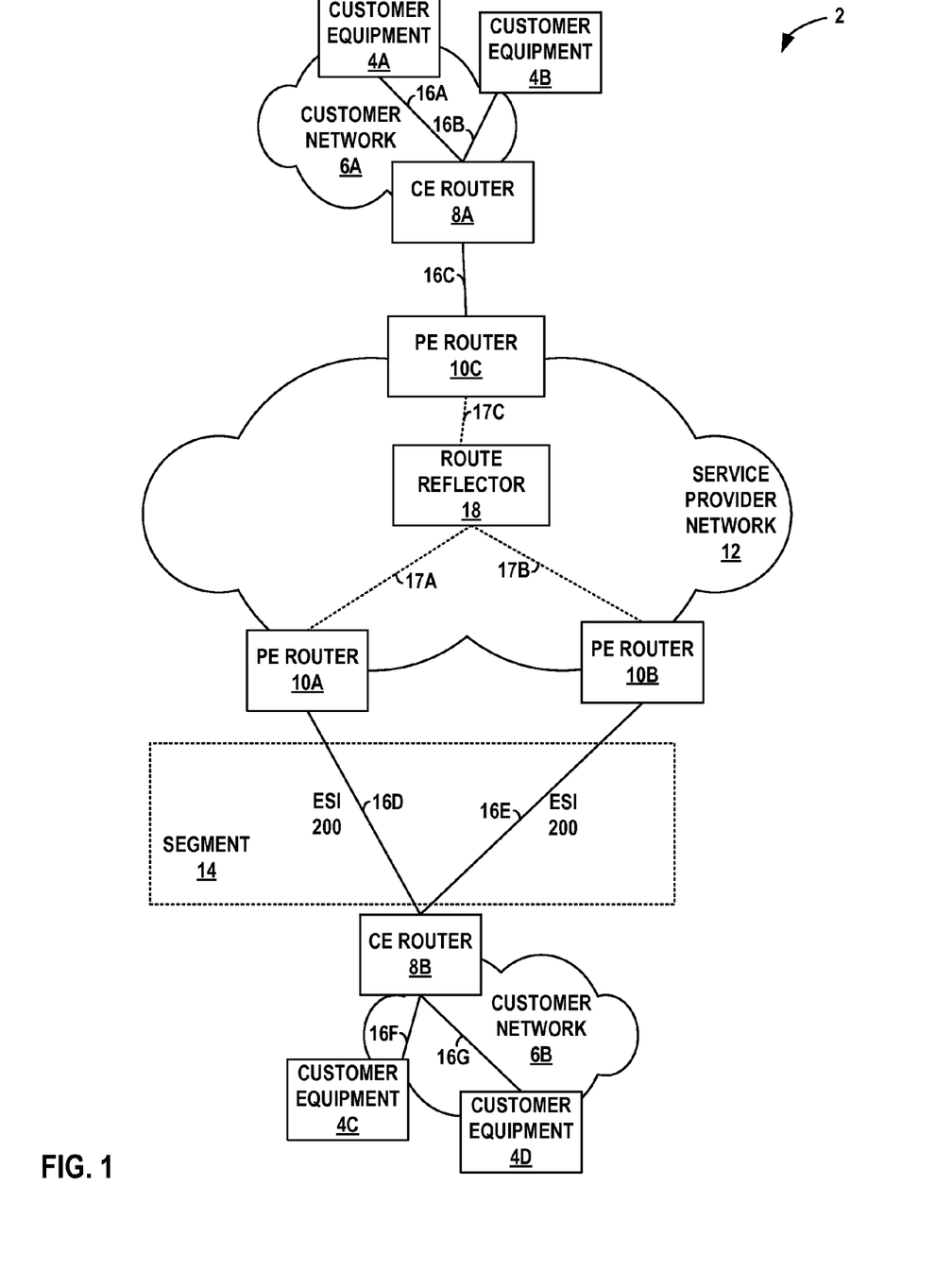
FIG. 1 is a block diagram illustrating an example system, in accordance with techniques of the disclosure.

FIG. 1 is a block diagram illustrating an example system, in accordance with techniques of the disclosure. In the example of FIG. 1, PE routers 10A-10C ("PE routers 10") provide customer devices 4A-4D ("customer devices 4") associated with customer networks 6A-6B ("customer networks 6") with access to service provider network 12 via CE routers 8A-8B ("CE routers 8"). Communication links 16A-16G may be Ethernet, ATM or any other suitable network connections.

PE routers 10 and CE routers 8 are illustrated as routers in the example of FIG. 1. However, techniques of the disclosure may be implemented using switches or other suitable network devices that participate in a layer two (L2) virtual private network service, such as an Ethernet Virtual Private Network (EVPN). Customer networks 6 may be networks for geographically separated sites of an enterprise. Each of customer networks 6 may include additional customer equipment 4A-4D ("customer equipment 4"), such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely exemplary. For example, an enterprise may include any number of customer networks 6. Nonetheless, for ease of description, only customer networks 6A-6B are illustrated in FIG. 1.

Service provider network 12 represents a publicly accessible computer network that is owned and operated by a service provider, which is usually large telecommunications entity or corporation. Service provider network 12 is usually a large layer three (L3) computer network, where reference to a layer followed by a number refers to a corresponding layer in the Open Systems Interconnection (OSI) model. Service provider network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 12 may be coupled to one or more networks administered by other providers, and may thus form part of a large-scale public network infrastructure, e.g., the Internet. Consequently, customer networks 6 may be viewed as edge networks of the Internet. Service provider network 12 may provide computing devices within customer networks 6 with access to the Internet, and may allow the computing devices within the customer networks to communicate with each other.

Service provider network 12 may include a variety of network devices other than PE routers 10. For instance, service provider network 12 may include a route reflector 18. In some examples, route reflector 18 may reside within service provider network 12 and along a path in service provider network 12 between two or more PE routers. Because of an internal BGP (IBGP) full-mesh requirement, some networks may use route reflectors to simplify configuration. Using a route reflector, routers are grouped into clusters, which are identified by numeric identifiers unique to an autonomous system (AS). Within the cluster, a BGP session is configured from a single router (the route reflector) to each internal peer. With this configuration, the IBGP full-mesh requirement may be met by route reflector 18. To use route reflection in an AS, one or more routers are designated as a route reflector—typically, one per point of presence (POP). Route reflectors have the BGP ability to re-advertise routes learned from an internal peer to other internal peers. Rather than requiring all internal peers to be fully meshed with each other, route reflection may have only the route reflector be fully meshed with all internal peers.

Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of network links 16, such that the network elements of system 2 are not directly coupled.

Service provider network 12 typically provides a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by service provider network 12 includes L2 EVPN service. For example, an EVPN is a service that provides a form of L2 connectivity across an intermediate L3 network, such as service provider network 12, to interconnect two L2 customer networks, such as L2 customer networks 6, that are usually located in two different geographic areas. Often, EVPN is transparent to the customer networks in that these customer networks are not aware of the intervening intermediate service provider network and instead act and operate as if these two customer networks were directly connected and formed a single L2 network. In a way, EVPN enables a form of a transparent LAN connection between two geographically distant customer sites that each operates a L2 network and, for this reason, EVPN may also be referred to as a "transparent LAN service."

To configure an EVPN, a network operator of the service provider configures various devices included within service provider network 12 that interface with L2 customer networks 6. The EVPN configuration may include an EVPN instance (EVI), which consists of one or more broadcast domains. Generally, an EVI may refer to a routing and forwarding instance on a PE router, such as PE routers 10A-10C. Consequently, multiple EVIs may be configured on PE routers 10 for Ethernet segment 14, as further described herein, each providing a separate, logical layer two (L2) forwarding domain. In this way, multiple EVIs may be configured that each includes one or more of PE routers 10A-10C of Ethernet segment 14. In some examples, Ethernet Tags are then used to identify a particular broadcast domain, e.g., a VLAN, in an EVI. A PE router may advertise a unique EVPN label per <ESI, Ethernet Tag> combination. This label assignment methodology is referred to as a per <ESI, Ethernet Tag> label assignment. Alternatively, a PE router may advertise a unique EVPN label per MAC address. In still another example, a PE router may advertise the same single EVPN label for all MAC addresses in a given EVI. This label assignment methodology is referred to as a per EVI label assignment.

In the example of FIG. 1, for use in transporting communications associated with one or more EVIs, the network operator configures PE routers 10 to provision pseudowires 17A-17C for transporting L2 communications. Pseudowires are logical network connections formed from two unidirectional label switched paths (LSPs) that emulate a connection not natively offered by service provider network 12 for consumption outside the boundaries of that service provider network 12. Pseudowires may emulate a L2 connection within service provider network 12 enabling service provider network 12 to offer emulated L2 connectivity externally for consumption by L2 customer networks 6. As such, each EVPN instance may operate over pseudowires 17 to enable a logical form of L2 connectivity between customer networks 6.

To configure an EVI, pseudowires 17 may be configured such that each of PE routers 10 that provide a given EVI is interconnected by way of pseudowires to every other one of the PE devices participating in the EVI. In the example of FIG. 1, each of PE routers 10 provides access to the EVPN for carrying traffic associated with customer networks 6 and, therefore, each of PE devices 10 within the same Ethernet segment may be connected to every other PE device 10 via pseudowires 17. Once pseudowires are configured in this manner, EVPN may be enabled within PE devices 10 to operate over the pseudowires, which may in this context operate as logical dedicated links through service provider network 12. In operation, EVPN generally involves prepending or otherwise inserting a tag and a pseudowire label onto incoming L2 packets, which may also be referred to as L2 frames (particularly in the context of Ethernet), and transmitting the tagged packets through a corresponding one of the configured pseudowires. Once EVPN is configured within service provider network 12, customer devices 4 within customer networks 6 may communicate with one another via EVPN as if they were directly connected L2 networks.

In order to establish the EVPN, an EVPN protocol executing on PE routers 10A-10C triggers EVPN designated forwarder (DF) election for Ethernet segment 14. This may be accomplished, for example, by EVPN protocol executing on each of PE routers 10A-10C that participates in the Ethernet segment directing the router to output a routing protocol message advertising an Ethernet Segment Identifier (ESI), which is typically unique across all EVPN instances (EVIs). In addition, for each EVI, the EVPN protocol directs the router to output a routing protocol message advertising an Ethernet Auto-Discovery (AD) route specifying the relevant ESI for the Ethernet segment coupled to the EVPN instance. Once the EVPN is operational for the {EVI, ESI}pair, PE routers 10A-10C output routing protocol messages to remote PE router 10D to announce media access control (MAC) addresses associated with customer equipment in customer network 6B.

For example, in typical operation, PE routers 10A-10C communicate using the Border Gateway Protocol (BGP) and the EVPN protocol specifies BGP Network Layer Reachability Information (NLRI) for the EVPN and may define different route types for conveying EVPN information via the BGP routing protocol. The EVPN NLRI is typically carried in BGP using BGP Multiprotocol Extensions. An Ethernet Segment route advertised by each PE router 10A-10C using BGP includes a Route Distinguisher and Ethernet Segment Identifier. An Ethernet AD route advertised by each PE router 10A-10C for each EVI, specifies a Route Distinguisher (RD) (e.g., an IP address of an MPLS Edge Switch (MES)), ESI, Ethernet Tag Identifier, and MPLS label. Subsequent BGP media access control (MAC) routes output by PE router 10A-10C announce MAC addresses of customer equipment 4 for the EVPN include a RD, ESI, Ethernet Tag Identifier, MAC address and MAC address length, IP address and IP address length, and MPLS label.

In the example of FIG. 1, when providing the EVPN service to customer networks 6, PE routers 10 and CE routers 8 typically perform MAC address learning to efficiently forward L2 network communications in system 2.

That is, as PE routers 10 and CE routers 8 forward Ethernet frames, the routers learn L2 state information for the L2 network, including MAC addressing information for customer equipment 4 within the network and the physical ports through which customer equipment 4 are reachable. PE routers 10 and CE routers 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

Moreover, as PE routers 10 learn the MAC address for customer equipment 4 reachable through local attachment circuits, the PE routers 10 utilize MAC address route advertisements of a layer three (L3) routing protocol (i.e., BGP in this example) to share the learned MAC addresses and to provide an indication that the MAC addresses are reachable through the particular PE router that is issuing the route advertisement. In the EVPN implemented using PE routers 10 for a given EVI, each of PE routers 10 advertises the locally learned MAC addresses to other PE routers 10 using a BGP route advertisement. For example, in a BGP EVPN, a Type 2 BGP EVPN route advertisement is used in the control plane to communicate MAC address/IP address combinations, where the IP address is optional. When only a MAC address is communicated, the BGP EVPN Type 2 route advertisement is also referred to herein as a "MAC route" or a "MAC Advertisement route." As further described below, a MAC route typically specifies an individual MAC address of customer equipment 4 along with additional forwarding information, such as a route descriptor, route target, layer 2 segment identifier, MPLS label, etc. In this way, PE routers 10 use BGP to advertise and share the MAC addresses or MAC address/IP combinations learned when forwarding layer two communications associated with the EVPN.

Accordingly, PE routers 10 may perform both local learning and remote learning of MAC addresses or MAC address/IP address combinations. Additional information with respect to the EVPN protocol is described in "BGP MPLS Based Ethernet VPN," RFC 7432, Internet Engineering Task Force (IETF), Jul. 2, 2014, the entire contents of which are incorporated herein by reference.

Each of PE routers 10 (e.g., PE router 10D) utilizes MAC routes specifying the MAC addresses learned by other PE routers to determine how to forward L2 communications to MAC addresses that belong customer equipment 4 connected to other PEs, i.e., to remote CE routers and/or customer equipment behind CE routers operatively coupled to PE routers. That is, each of PE routers 10 determine whether Ethernet frames can be sent directly to a particular one of the other PE routers 10 or whether to treat the Ethernet frames as so called "BUM" traffic (Broadcast, Unidentified Unicast or Multicast traffic) that is to be flooded within the EVPN based on the MAC addresses learning information received from the other PE routers.

As shown in FIG. 1, CE routers 8 may be multi- and/or singly-homed to one or more of PE routers 10. In EVPN, a CE router may be said to be multi-homed when it is coupled to two physically different PE routers on the same EVI when the PE routers are resident on the same physical Ethernet Segment. As one example, CE router 8B is coupled to PE routers 10A and 10B via links 16D and 16E, respectively, where PE routers 10A and 10B are capable of providing access to EVPN for L2 customer network 6B via CE router 8B. In some examples, PE router 10A may be directly or "locally" coupled to CE router 8B because PE router 10A is one-hop away from CE router 8B. In some examples, PE router 10A may be directly coupled to CE router 8B because a physical communication link 16D directly connects a physical interface of PE router 10A to a physical interface of CE router 8B.

In instances where a given customer network (such as customer network 6B) may couple to service provider network 12 via two different and, to a certain extent, redundant links, the customer network may be referred to as being "multi-homed." In this example, CE router 8B may be multi-homed to PE routers 10A and 10B because CE router 8B is coupled to two different PE routers 10A and 10B via separate and, to a certain extent, redundant links 16D and 16E where both of PE routers 10A and 10B are capable of providing access to EVPN for L2 customer network 6B. Multi-homed networks are often employed by network operators so as to improve access to EVPN provided by service provider network 12 should a failure in one of links 16D, 16E, and 16F occur. In a typical EVPN configuration, only the multi-homing PEs 10A-10B participate in DF election for each ESI. PE 10C not connected to the ESI has no direct knowledge of the DF election result for a give ESI.

In active-active mode configurations, remote PE 10C is typically configured to install the MAC routes for the ESI, such that traffic downstream traffic to customer network 6B is balanced between PE routers 10A and 10B, which are each included in the ESI. In the example of FIG. 1, PE routers 10A and 10B may be configured in EVPN active-active mode, such that PE router 10C load-balances downstream network traffic to customer network 6B between PE routers 10A and 10B. In active-active mode, each of PE routers 10A and 10B may be configured as part of the same Ethernet Segment and therefore have the same Ethernet Segment Identifier. PE routers 10A and 10B may each advertise Ethernet AD routes to PE router 10C that specify respective IP addresses and ESIs for each of PE routers 10A and 10B. In this way, PE router 10C may configure one or more of its forwarding units (or "forwarding engines") to load balance network traffic destined for customer network 6B between PE routers 10A and 10B.

An EVPN, such as illustrated in FIG. 1, may operate over an Multi-Protocol Label Switching (MPLS) configured network and use MPLS labels to forward network traffic accordingly. MPLS is a mechanism used to engineer traffic patterns within Internet Protocol (IP) networks according to the routing information maintained by the routers in the networks. By utilizing MPLS protocols, such as the Label Distribution protocol (LDP) or the Resource Reservation Protocol with Traffic Engineering extensions (RSVP-TE), a source device can request a path through a network to a destination device, i.e., a Label Switched Path (LSP). An LSP defines a distinct path through the network to carry MPLS packets from the source device to a destination device. Using a MPLS protocol, each router along an LSP allocates a label and propagates the label to the closest upstream router along the path. Routers along the path add or remote the labels and perform other MPLS operations to forward the MPLS packets along the established path.

As shown in the example of FIG. 1, PE routers 10A-10C may provide an MPLS core for sending network packets from customer network 6A to and from customer network 6B. Each of PE routers 10A-10C implement the MPLS protocol and apply one or more MPLS labels, i.e., a label stack, to network packets in accordance with routing and forwarding information configured at each respective PE router. In an EVPN, a label stack applied to a network packet may include multiple labels. For instance, a label stack may include an outer label and an inner label.

The outer label serves as a "transport label" that uniquely identifies a PE router in an MPLS core. That is, each of PE routers 10A-10C may exchange control plane messages at configuration and startup that specify an outer label that uniquely identifies each respective PE router. For instance, PE router 10A may send control plane messages that specify an outer label that identifies PE router 10A to PE routers 10B-10C. PE routers 10B-10C may configure their respective forwarding units such that network packets that include the outer label corresponding to PE router 10A are forwarded to PE router 10A.

The inner label, or "service label," of the MPLS label stack provides EVPN-specific configuration information. As described above, EVPN defines Ethernet AD routes, MAC advertisement routes, and Ethernet Segment routes. An Ethernet AD route, for example, may be structured according to the following format of Table 1:

TABLE 1

AD route advertisement

Route Descriptor (8 octets)
Ethernet Segment Identifier (10 octets)
Ethernet Tag ID (4 octets)
MPLS Alias Label (3 octets)

In one example, PE router 10A may send an Ethernet AD route to PE router 10C initially at startup and configuration that includes an MPLS label as shown above. PE router 10C may configure one or more of its forwarding units to apply the MPLS label of the Ethernet AD route from PE router 10A as the inner label in a label stack applied to network packets that are destined to PE router 10A. PE router 10C would then apply the transport label identifying PE router 10A as the outer label in the label stack. In this way, the inner label provides EVPN-specification configuration information about the Ethernet AD route that PE router 10C uses to forward network packets through the EVPN.

In the example of FIG. 1, each of PE routers 10A and 10B may use internal Integrated Routing and Bridging (IRBs) such that each PE router is able to provide both L3 routing and L2 switching between different L2 domains within a single router. Additional information and examples for using IRBs to provide EVPN/IP-VPN integrated configurations are described in "E-VPN and IP-VPN Integrated Solution," draft-sajassi-12vpn-evpn-ipvpn-interop-02, L2VPN Workgroup, Oct. 31, 2013, the entire contents of which are incorporated herein by reference.

An IRB, generally, includes a routing interface for an IRB subnet as well as a bridge domain and thus facilitates simultaneous L2 bridging and L3 routing from the bridge domain. A bridge domain is a set of physical or logical interfaces of one or more devices that share the same flooding or broadcast characteristics. For a bridge domain of an L2/L3 device (e.g., a router) that is configured with a single VLAN identifier, an integrated routing and bridging (IRB) interface (or "IRB") may be further configured within the router to act as an L3 routing interface for the bridge domain associated with the VLAN identifier. The IRB subnet may effectively be a subnet for the bridging domain associated with the VLAN identifier. A router having a configured IRB switches or routes Internet Protocol (IP) packets arriving at the IRB of the bridge domain based on the destination MAC address. The router forwards those frames addressed to a gateway MAC address (i.e., a MAC address for the router) to other L3 interfaces of the router. Contrariwise, for those frames addressed to a MAC address other than the gateway MAC address, the router forwards the frames to a different L2 interface in the bridge domain of the IRB. As such, IRBs may facilitate the forwarding of network packets for both inter and intra subnet switching, not only within a data center network but across different data center networks.

In this way, one or more of PE routers 10 may implement IRB as described in "Integrated Routing and Bridging in EVPN", ietf-bess-evpn-inter-subnet-forwarding, Nov. 11, 2014, https://tools.ietf.org/html/draft-ietf-bess-evpn-inter-subnet-forwarding-00, which is hereby incorporated by reference herein in its entirety. As shown in FIG. 1, PE routers 10 may be configured with one EVI, and under the single EVI there may be two bridge domains with subnet-1 (or VLAN1) and subnet-2 (or VLAN2), respectively.

As shown in FIG. 1, each of PEs 10 may implement Virtual Routing Functionality (VRF) in which each PE router include one or more VRF instances. Each VRF instance in a given router, for example, represents a logically separate routing and forwarding instance, including both a corresponding routing table and forwarding information in the control plane and forwarding plane, respectively, for the router. In this way, use of VRFs permits multiple routing tables to exist in logical separation within a single physical router. In some instances, an attachment circuit may be associated with a particular VRF, and the particular VRF may be configured to forward traffic for the attachment circuit. VRFs may be configured to include functionality described in "BGP/MPLS IP Virtual Private Networks (VPNs)," February 2006, https://tools.ietf.org/html/rfc4364, which is hereby incorporated by reference herein in its entirety.

Multiple subnets (or VLANs) may be configured by PE routers 10. Accordingly, PE routers 10 may forward network packets (e.g., multicast packets) to between customer networks 6 using one or more layer 2 subnetworks. One or more of PE routers 10 may implement IRB interfaces, which support layer-2 bridging and layer-3 routing on the same interface. As such, an IRB interface allows a router to route local packets within to router to another routed interface or to another bridging domain that has a layer-3 protocol configured. Accordingly, one or more IRBs may be used to locally route inter-subnet traffic. For instance, using one or more IRBs, a PE may internally route inter-subnet traffic between two or more layer 2 subnetworks. As an example, subnet-1 (or VLAN1) and subnet-2 (or VLAN2) may be connected to the same VRF instance of PE router 10A through two IRBs. In some examples, two PE routers may both have the subnet-1 and subnet-2. From a layer-3 point of view, PE router 10A with NVE functionality appears connected to both VLAN1 and VLAN2 through its respective IRB interfaces. In some examples, one or more IRBs may appear to one or more PE routers to be attached to the same EVI. As such, an IRB interface may appear to one or more PE routers to be connected to an EVPN.

In the example of FIG. 1, system 2 may be implemented using Internet Protocol v6. Each of PE router 10A and 10B may each be configured in a EVPN active-active mode for Ethernet Segment 14, which has an ESI 200. As such, CE router 8B may load balance network traffic sent using Ethernet Segment 14 between PE routers 10A and 10B. For instance, using a hashing algorithm, CE router 8B may distribute network traffic for Ethernet Segment 14 to PE routers 10A and 10B.

Initially, if PE router 10A needs to determine the link-layer or MAC address for another device (referred to generally as a "neighbor"), such as CE router 8B, which is known to reside on attached link 16D, PE router 10A may use the Neighborhood Discovery protocol for IP version 6. Additional information for Neighborhood Discovery protocol for IP version 6 is described in "Neighbor Discovery for IP version 6 (IPv6)," RFC 4861, Internet Engineering Task Force (IETF), September, 2007, the entire contents of which are incorporated herein by reference. To determine the MAC address for CE router 8B, PE router 10A may generate a neighbor solicitation request as described in RFC 4861, which PE router 10A may send to CE router 8B based on the IP address for CE router 8B.

Upon sending the neighbor solicitation, PE router 10A creates a corresponding neighbor cache entry (or "neighbor discovery (ND) entry") in a Neighbor Cache, as described in RFC 4861, indicating the request has been sent and a response is expected. In some examples, the reachability state when initially determining the MAC address may be set to "PROBE" as described in RFC 4861. The neighbor cache entry in the Neighbor Cache may include state information about the neighbor solicitation sent by PE router 10A to CE router 8B. In this way, if PE router 10A does not receive a neighbor advertisement from CE router 8B within a threshold period of time, PE router 10A may clear the neighbor cache entry and/or send another neighbor solicitation request to CE router 8B.

Upon receiving the neighbor solicitation request, CE router 8B generates and outputs a neighbor advertisement as a reply. The neighbor advertisement may include, but is not limited to, the MAC address of CE router 8B. However, because CE router 8B is multi-homed to PE routers 10A and 10B in active-active mode, in this example, it is possible due to load-balancing traffic in Ethernet Segment 14, that CE router 8B forwards the neighbor advertisement to PE router 10B, which did not originally send the neighbor solicitation. In this case, PE router 10B receives the neighbor advertisement from CE router 8B and determine that is internal Neighbor Cache does not include a neighbor cache entry indicating a neighbor solicitation was to CE router 8B because PE router 10A rather than PE router 10B sent the neighbor solicitation to CE router 8B that resulted in CE router 8B generating the neighbor advertisement.

In general, RFC 4861 states in Section 7.2.5 that "[w]hen a valid Neighbor Advertisement is received (either solicited or unsolicited), the Neighbor Cache is searched for the target's neighbor cache entry. If no neighbor cache entry exists, the advertisement should be silently discarded. There is no need to create a neighbor cache entry if none exists, since the recipient has apparently not initiated any communication with the target." As such, according to the approach in the RFC, PE router 10B drops the Neighbor Advertisement. As such, in the example identified above, PE router 10A would fail to receive the neighbor advertisement that it was expecting in response to the neighbor solicitation, and would therefore be unable to learn the MAC address of CE router 8B. As such, in the EVPN context for IPv6 of FIG. 1 where CE router 8B is multi-homed to multiple PE routers configured in active-active mode for an Ethernet Segment, Section 7.2.5 of RFC 4861 may prevent PE router 10A from learning the MAC address of CE router 8B because CE router 8B is load-balancing network traffic for the Ethernet Segment between PE routers 10A and 10B.

Techniques of the disclosure address the limitations imposed by Section 7.2.5 of RFC 4861 in the EVPN context, thereby enabling IPv6 neighbor discovery in an active-active EVPN environment and in other scenarios where neighbor discovery would otherwise fail. More particularly, the techniques may validate and accept a solicited neighbor advertisement from a CE router, which has been generated in response to any peer EVPN PE neighbor solicitation request. In the EVPN context of this disclosure, some or all of the PE routers participating in the EVPN have remote IP and MAC information of remote PE's IRB interfaces. In the techniques of this disclosure, PE routers can use the remote IP and MAC information of remote PE's IRB interfaces to validate an incoming solicited neighbor advertisement packet received on IRB interface and determine whether to share the information with remote PEs. On receipt of solicited neighbor advertisement that is being forwarded between L2 domains (i.e., by way of the IRB interfaces of the PE), if the destination MAC address of the neighbor advertisement matches any of MAC addresses of a remote PE IRB interface, the PE router that received the neighbor advertisement will accept the advertisement for learning purposes, create a corresponding neighbor cache entry in the Neighbor Cache and share the MAC address or MAC/IP address combination with the remote PE having an IRB MAC address that matches the destination MAC of the neighbor advertisement.

According to the techniques described herein, in the event PE router 10A sends a neighborhood solicitation to CE router 8B and CE router 8B sends a neighborhood advertisement to PE router 10B due to active-active mode for Ethernet Segment 14, PE router 10B further processes the neighborhood advertisement even though the Neighbor Cache of PE router 10B did not initiate the neighborhood solicitation and, therefore, does not include a corresponding neighbor cache entry for a neighborhood solicitation sent to CE router 8B. If PE router 10B has already learned the MAC and IP address for CE router 8B prior to receiving the neighbor solicitation, PE router 10B may send a message to PE router 10A that includes the MAC address of CE router 8B. In this case PE router 10A learns the MAC address of CE router 8B from the contents of the EVPN MAC route message or via BGP-EVPN NLRI. In such examples, EVPN MAC route sharing with BGP EVPN extensions for MAC route messages enables PE router 10A to notify PE router 10B of the MAC address for CE router 8B.

If, however, PE router 10B has not previously learned the MAC address of CE router 8B, then PE router 10B may determine whether to store, in its routing and/or forwarding information, the MAC and IP address of CE router 8B based on whether the destination MAC and IP address of the packet header for the neighbor advertisement matches a MAC and IP address of another PE router that was received at initial configuration and startup. For instance, if PE routers 10A and 10B each include one or more IRB interfaces, PE routers 10A and 10B may have previously exchanged Ethernet Segment Routes at initial configuration or startup, which each include an IP address for the sending router (or Route Descriptor) and a Ethernet Segment Identifier. In this way, each of PE routers 10A and 10B learn the IP and MAC addresses for other PE routers.

Figure 2:
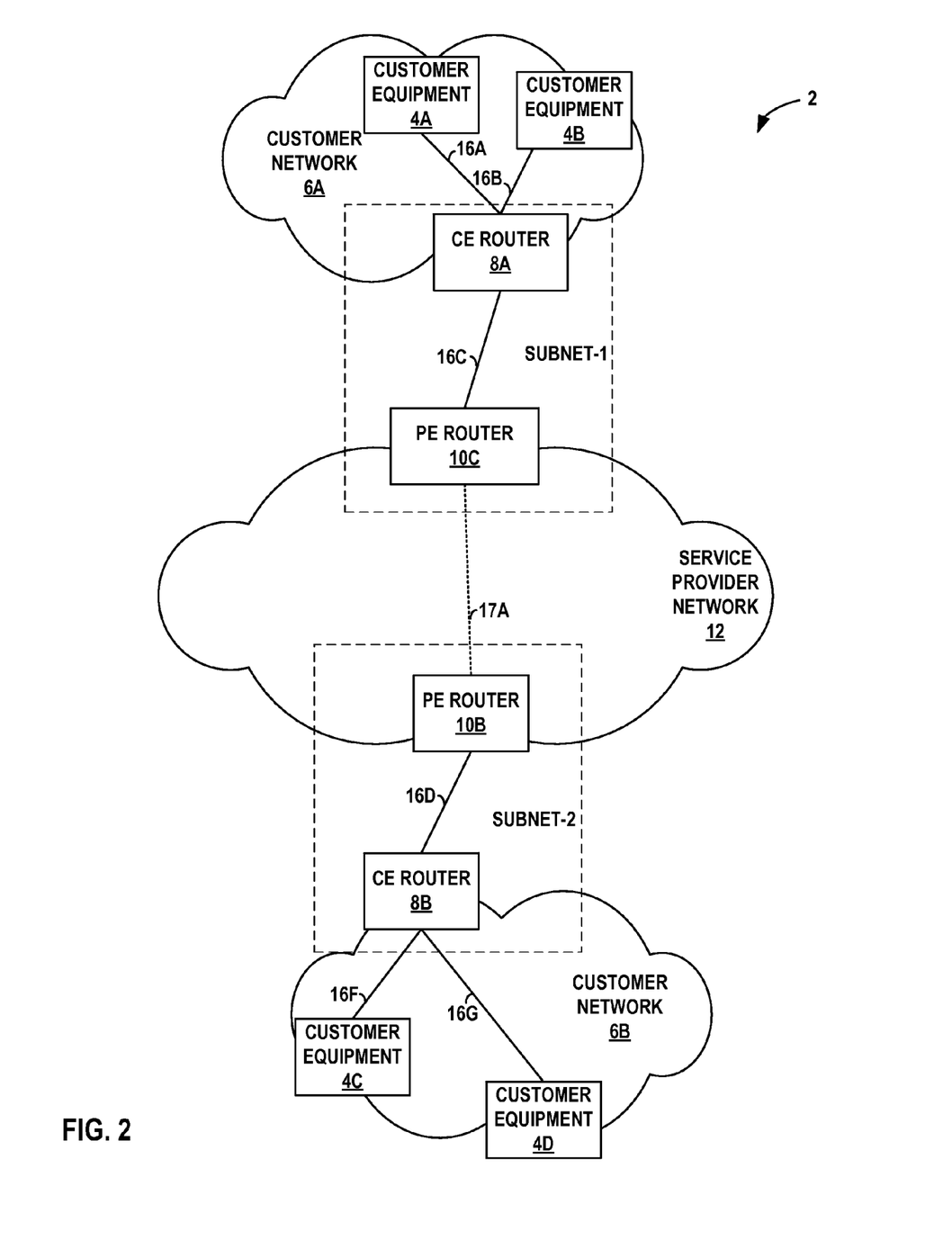
FIG. 2 is a block diagram illustrating an example system, in accordance with techniques of the disclosure

In the example of FIG. 1, PE router 10B may have previously received an Ethernet Segment Route for an IRB interface of PE router 10A, and therefore learned the MAC and IP address of PE router 10A. If PE router 10B receives a neighbor advertisement from CE router 8B in response to a neighbor solicitation from PE router 10A, then PE router 10B may compare the destination MAC and IP addresses of the neighbor advertisement to determine if a match exists with any IP and MAC addresses of PE routers for which PE router 10B previously received Ethernet Segment Routes. In the Example of FIG. 1, since PE router 10B previously learned MAC and IP addresses for PE router 10A, and the destination MAC and IP addresses of the neighbor advertisement match the previously learned MAC and IP addresses for PE router 10A, then PE router 10B may store, in its routing and/or forwarding information, the MAC and IP address of CE router 8B. PE router 10B may send an EVPN MAC route message or via BGP-EVPN NLRI to PE router 10A that includes the MAC address of CE router 8B. In this case PE router 10A learns the MAC address of CE router 8B from the contents of the EVPN MAC route message or via BGP-EVPN NLRI. In this way, PE router 10A may learn the MAC address of CE router 8B although the neighbor advertisement was received by PE router 10B rather than PE router 10A. In some examples, PE router 10B may forward the neighbor advertisement generated by CE router 8B to PE router 10A. In some examples, PE router 10B may forward the neighbor advertisement generated by CE router 8B to PE router 10A and without sending an EVPN MAC route message or via BGP-EVPN NLRI to PE router 10A that includes the MAC address of CE router 8B FIG. 2 is a block diagram illustrating an example system, in accordance with techniques of the disclosure. In general, systems, devices and components of FIG. 2 may operate substantially similar FIG. 1. CE router 8A and PE router 10C are included in a first subnet-1 (or VLAN1), and PE router 10B and CE router 8B are included in subnet-2 (or VLAN2). However, in some examples both PE routers 10B and 10C have both the subnets. In some examples, IPv6 neighbor solicitations are generated to same subnet, so EVPN instances on both of PE routers 10B and 10C may have both subnets. The host in one subnet attached to a PE may be trying to talk to host in a different subnet attached to remote PE. Each of PE router 10B and PE router 10C may have two subnets subnet-1 and subnet-2. IP-VRF on each of the PE routers 10B and 10C may have IRB of both the subnets.

CE router 8A is configured to use an IRB interface of PE router 8A as the default gateway, while CE router 8B is configured to use an IRB interface of PE router 8B as the default gateway. The IRB interface of PE router 10C enables PE router 10C to forward network traffic from CE router 8A to subnet-2 (or VLAN2), while the IRB interface of PE router 10B enables PE router 10B to forward network traffic from CE router 8B to subnet-1 (or VLAN1). Each of PE routers 10B and 10C may maintain respective IP-VRF tables, which include entries to perform inter-subnet forwarding between subnet-1 (or VLAN1) and subnet-2 (or VLAN2).

In the topology of FIG. 2, the forwarding flow (or asymmetric inter-subnet forwarding) for CE router 10C to CE router 10B occurs as follows. Initially, PE router 10B sends a neighbor solicitation request to CE router 8B, which replies with a neighbor advertisement. PE router 10B generates a neighbor cache entry in its Neighbor Cache for CE router 8B. PE router 10B also shares the IP and MAC information for CE router 8B to PE1 via BGP protocol using a BGP Network Layer Reachability Information (NLRI) message. In the same way, PE router 10C sends a neighbor solicitation request to CE router 8A, which replies with a neighbor advertisement. PE router 10C generates a neighbor cache entry in its Neighbor Cache for CE router 8A. PE router 10C also shares the IP and MAC information for CE router 8A to PE router 10C via BGP protocol using a BGP Network Layer Reachability Information message.

When forwarding network traffic, CE router 8A may forward a packet destined for CE router 8B to PE router 10C's IRB interface based on the default gateway configuration. When this packet arrives at the IRB interface, PE router 10B performs a lookup using its EVPN MAC table. Since the MAC address of the IRB interface is the destination address for the packet, PE router 10B performs inter subnet routing and performs an additional lookup on an IP-VRF forwarding table that is maintained by PE router 10C. Since a neighbor cache entry exists in IP-VRF table to bridge network traffic from subnet-1 (or VLAN1) to subnet-2 (or VLAN2) via PE router 10B, PE router 10C adds the MAC address for CE router 8B as the destination MAC address in the packet and forwards it via MPLS tunnel to PE router 10B. PE router 10B in turn forwards the packet to CE router 8B.

In some examples, however, PE router 10C may need to forward network traffic from CE router 8A to CE router 8B prior to PE router 10B sharing the IP and MAC information for CE router 8A to PE router 10C via BGP protocol using a BGP Network Layer Reachability Information message. CE router 8A's subnet route is made available in all participating remote PEs either (1) using a proposed EVPN route type described in "IP Prefix Advertisement in EVPN", draft-ietf-bess-evpn-prefix-advertisement-01, Mar. 9, 2015, https://tools.ietf org/html/draft-ietf-bess-evpn-prefix-advertisement-01, which is hereby incorporated by reference herein in its entirety, or (2) in some networks by manual configuration of gateway IPs of subnets on PE router IRB interfaces.

If PE router 10C sends a neighbor solicitation to CE router 8B, then PE router 10B will forward the neighbor solicitation to CE router 8B. In the topology of FIG. 2, due to the presence of a CE router 8B subnet route stored in the forwarding information PE router 10C, the neighbor solicitation packet destined to CE router 8B will match the subnet route stored at PE router 10C for CE router 8B. PE router 10B may use the subnet route for CE router 8B to forward the neighbor solicitation packet to PE router 10B.

CE router 8B may respond to the neighbor solicitation with a neighbor advertisement that is initially sent to PE router 10B for forwarding. However, PE router 10B will initially process the neighbor advertisement en route to PE router 10C. Due to Section 7.2.5 of RFC 4861, PE router 10B would determine that its Neighbor Cache does not include a neighbor cache entry for neighbor solicitation to CE router 8B, and may discard the neighbor advertisement. PE router 10B may therefore be unable to learn the MAC address of CE router 8B due to the limitations of Section 7.2.5 of RFC 4861. In other words, if a host from a remote site tries to reach a host on different site with different subnet, the neighbor advertisement may be dropped in PE router, such as PE router 10B.

Techniques of this disclosure overcome the limitation of Section 7.2.5 of RFC 4861 as described above. For example, if PE router 10C sends a neighborhood solicitation to CE router 8B, and CE router 8B sends a neighborhood advertisement in reply, PE router 10B may further process the neighborhood advertisement, even if the Neighbor Cache of PE router 10B has not yet learned the MAC address for CE router 8B or does not include a corresponding neighbor cache entry for a neighborhood solicitation sent to CE router 8B. That is, PE router 10B may not automatically discard the neighbor solicitation although the Neighbor Cache does not include a corresponding neighbor cache entry for a neighborhood solicitation sent to CE router 8B.

In the example of FIG. 2, since PE router 10B has not previously learned the MAC address of CE router 8B, then PE router 10B may determine whether to store, in its routing and/or forwarding information, the MAC and IP address of CE router 8B based on whether the destination MAC and IP address of the neighbor advertisement matches a MAC and IP address of another PE router that was received at initial configuration and startup. For instance, if PE routers 10C and 10B each include one or more IRB interfaces, PE routers 10B and 10C may have previously exchanged Ethernet Segment Routes at initial configuration or startup, which each include an IP address for the sending router (or Route Descriptor) and a Ethernet Segment Identifier. In this way, each of PE routers 10B and 10C learn the IP and MAC addresses for other PE routers.

In the example of FIG. 2, PE router 10B may have previously received an Ethernet Segment Route for an IRB interface of PE router 10C, and therefore learned the MAC and IP address of PE router 10C. If PE router 10B receives a neighbor advertisement from CE router 8B in response to a neighbor solicitation from PE router 10C, then PE router 10B may compare the destination MAC and IP addresses of the neighbor advertisement to determine if a match exists with any IP and MAC addresses of PE routers for which PE router 10B previously received Ethernet Segment Routes. In the Example of FIG. 2, since PE router 10B previously learned MAC and IP addresses for PE router 10C, and the destination MAC and IP addresses of the neighbor advertisement match the previously learned MAC and IP addresses for PE router 10C, then PE router 10B may store, in its routing and/or forwarding information, the MAC and IP address of CE router 8B. PE router 10B may send an EVPN MAC route message or via BGP-EVPN NLRI to PE router 10C that includes the MAC address of CE router 8B. In this case PE router 10C learns the MAC address of CE router 8B from the contents of the EVPN MAC route message or via BGP-EVPN NLRI. In this way, PE router 10C may learn the MAC address of CE router 8B although the neighbor advertisement was received by PE router 10B, which did not initially include a neighbor cache entry in its Neighbor Cache for a neighbor solicitation to CE router 8B. In some examples, PE router 10B may forward the neighbor advertisement generated by CE router 8B to PE router 10C. In some examples, PE router 10B may forward the neighbor advertisement generated by CE router 8B to PE router 10C and without sending an EVPN MAC route message or via BGP-EVPN NLRI to PE router 10C that includes the MAC address of CE router 8B.

Figure 3:
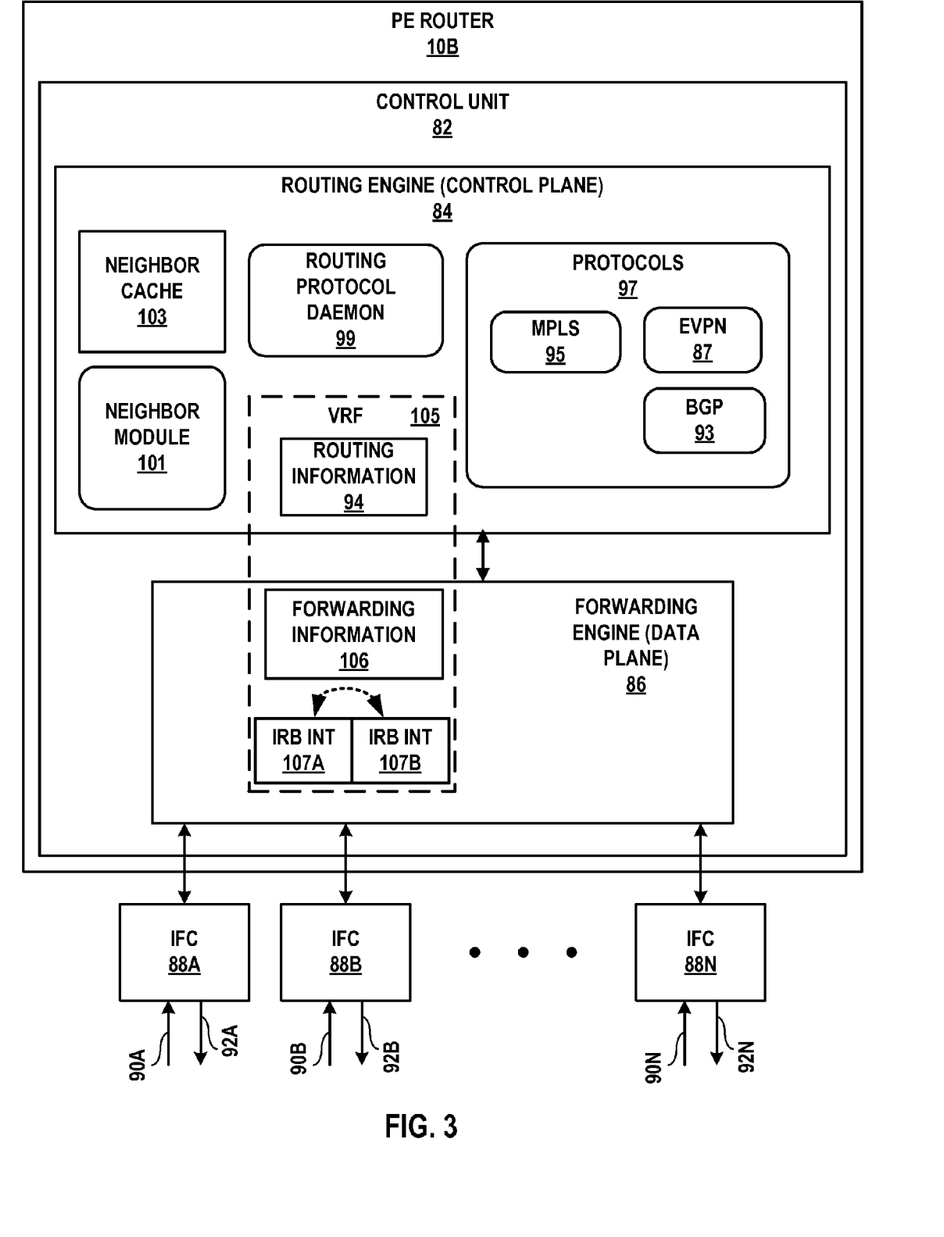
FIG. 3 is a block diagram illustrating an exemplary PE router capable of performing the disclosed techniques.

FIG. 3 is a block diagram illustrating an exemplary PE router 10B capable of performing the disclosed techniques. In general, PE router 10B may operate substantially similar to PE router 10B of FIGS. 1 and 2. In this example, PE router 10B includes interface cards 88A-88N ("IFCs 88") that receive packets via incoming links 90A-90N ("incoming links 90") and send packets via outbound links 92A-92N ("outbound links 92"). IFCs 88 are typically coupled to links 90, 92 via a number of interface ports. PE router 10B also includes a control unit 82 that determines routes of received packets and forwards the packets accordingly via IFCs 88.

Control unit 82 may comprise a routing engine 84 and a packet forwarding engine 86. Routing engine 84 operates as the control plane for PE router 10B and includes an operating system that provides a multi-tasking operating environment for execution of a number of concurrent processes. Routing engine 84, for example, execute software instructions to implement one or more control plane networking protocols 97. For example, protocols 97 may include one or more routing protocols, such as Border Gateway Protocol (BGP) 99 for exchanging routing information with other routing devices and for updating routing information 94. Protocols 97 may also include Multiprotocol Label Switching Protocol (MPLS) 95 for tunneling packets within service provider network 12.

Routing protocol daemon (RPD) 99 may use protocols 97 to exchange routing information, stored in routing information 94, with other routers. Routing information 94 may include information defining a topology of a network. RPD 99 may resolve the topology defined by routing information in routing information 94 to select or determine one or more routes through the network. RPD 99 may then generate forwarding information 106 and update forwarding plane 86 with routes from forwarding information 106.

Routing information 94 may describe a topology of the computer network in which PE router 10B resides, and may also include routes through the shared trees in the computer network. Routing information 94 describes various routes within the computer network, and the appropriate next hops for each route, i.e., the neighboring routing devices along each of the routes. Routing engine 84 analyzes stored routing information 94 and generates forwarding information 106 for forwarding engine 86. Forwarding information 106 may associate, for example, network destinations for certain multicast groups with specific next hops and corresponding IFCs 88 and physical output ports for output links 92. Forwarding information 106 may be a radix tree programmed into dedicated forwarding chips, a series of tables, a complex database, a link list, a radix tree, a database, a flat file, or various other data structures.

In addition, routing engine 84 executes EVPN protocol 87, which operates to communicate with other routers to establish and maintain an EVPN, such as the EVPN of FIG. 1, for transporting L2 communications through an intermediate network so as to logically extend an Ethernet network through the intermediate network. EVPN protocol 87 may, for example, communicate with EVPN protocols executing on remote routers. As described in this disclosure, BGP 93 and/or EVPN 87 may operate in passive mode. In some examples of passive mode, EVPN 87 will not perform any MAC learning that is performed by other PE routers in an EVPN and PE router 10B will be a pure listener for EVPN routes. In some examples of passive mode, PE router 10B will be a pure listener for only a specific type of EVPN route, such as an Ethernet AD route. In example embodiments, BGP 93 and EVPN 87 operate in accordance with the techniques described herein so as to listen for and process Ethernet A-D per EVI routes that have been sent by other PE routers 10.

In some examples, forwarding engine 86 arranges forwarding structures as next hop data that can be chained together as a series of "hops" along an internal packet forwarding path for the network device. In many instances, the forwarding structures perform lookup operations within internal memory of ASICs included in forwarding engine 86, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs determines the manner in which a packet is forwarded or otherwise processed by forwarding engine 86 from its input interface on one of IFCs 88 to its output interface on one of IFCs 88.

In the example of FIG. 3, VRF 105 has configured an IRP interfaces 107A, 107B so as to provided integrated routing and bridging between two subnets. That is, each IRB interface 107A, 107B provides a respective L3 interface for the respective L2 subnet, and VRF configures forwarding information 106 to bridge traffic between the domains.

As described in FIGS. 1 and 2, RFC 4861 states in Section 7.2.5 that "[w]hen a valid Neighbor Advertisement is received (either solicited or unsolicited), the Neighbor Cache is searched for the target's neighbor cache entry. If no neighbor cache entry exists, the advertisement should be silently discarded. There is no need to create a neighbor cache entry if none exists, since the recipient has apparently not initiated any communication with the target." Techniques of the disclosure address the limitations imposed by Section 7.2.5 of RFC 4861 in the EVPN context, thereby enabling IPv6 neighbor discovery in an active-active EVPN environment.

As further described with reference to FIGS. 1 and 2, PE router 10A or PE router 10C may receive a packet from customer network 6A that is destined for customer network 6B. PE router 10A or PE router 10C may perform a lookup using its forwarding information in order to route the packet. PE router 10A or PE router 10C may determine that the MAC address for CE router 8B is unknown, and subsequently determine the destination IP address for the packet as well as query routing information to determine a route to the destination IP address. PE router 10A or PE router 10C may then generate a neighborhood solicitation having a destination IP address of CE router 8B and may create a corresponding neighbor cache entry in its neighbor cache for the solicitation to CE router 8B. PE router 10A or PE router 10C may send the generated neighbor solicitation to CE router 8B.

CE router 8B receives the neighbor solicitation and generates a neighborhood advertisement, which is received PE router 10B in each of the examples of FIGS. 1 and 2. PE router 10B may further process the neighborhood advertisement, even if the neighbor cache 103 of PE router 10B does not include a corresponding neighbor cache entry for a neighborhood solicitation sent to CE router 8B. PE router 10B may check forwarding information 106 and/or neighbor cache 103 to determine whether it has already learned the MAC and IP address for CE router 8B prior to receiving the neighbor solicitation. If PE router 10B has already learned the MAC and IP address for CE router 8B, then PE router 10B may send a message to PE router 10A that includes the MAC address of CE router 8B. For instance, PE router 10A may learn the MAC address of CE router 8B from the contents of the EVPN MAC route message or via BGP-EVPN NLRI send by PE router 10B.

If, however, PE router 10B has not previously learned the MAC address of CE router 8B, then neighbor module 101 may determine whether to store, in routing information 94 and/or forwarding information 106, the MAC and IP address of CE router 8B based on whether the destination MAC and IP address of the neighbor advertisement matches a MAC and IP address of another PE router that was received at initial configuration and startup. As described in FIGS. 1 and 2, PE routers 10A-10C may have previously exchanged Ethernet Segment Routes at initial configuration or startup, which each include an IP address for the sending router (or Route Descriptor) and a Ethernet Segment Identifier. In this way, each of PE routers 10A-10C may learn the IP and MAC addresses for other PE routers.

In the example of FIG. 3, PE router 10B may have previously received an Ethernet Segment Route for an IRB interface of PE router 10A (in the example of FIG. 1) or PE router 10C (in the example of FIG. 2), and therefore learned the respective MAC and IP address of PE router 10A or PE router 10C. If PE router 10B receives a neighbor advertisement from CE router 8B in response to a neighbor solicitation from PE router 10A or 10C, then neighbor module 101 may compare the destination MAC and IP addresses of the neighbor advertisement to determine if a match exists, in forwarding information 106 or routing information 94, with any IP and MAC addresses of PE routers for which PE router 10B previously received Ethernet Segment Routes. In the Example of FIG. 1, since PE router 10B previously learned MAC and IP addresses for PE router 10A or PE router 10C, and the destination MAC and IP addresses of the neighbor advertisement match the previously learned respective MAC and IP addresses for PE router 10A or PE router 10C, then PE router 10B may store, in its routing and/or forwarding information, the MAC and IP address of CE router 8B.

Based on determining there is a match, PE router 10B may send an EVPN MAC route message or BGP-EVPN NLRI to PE router 10A or PE router 10C that includes the MAC address of CE router 8B. In this case PE router 10A or PE router 10C learns the MAC address of CE router 8B from the contents of the EVPN MAC route message or BGP-EVPN NLRI. In this way, PE router 10A or PE router 10C may learn the MAC address of CE router 8B although the neighbor advertisement was received by PE router 10B rather than PE router 10A.

The architecture of PE router 10B illustrated in FIG. 3 is shown for exemplary purposes only. The invention is not limited to this architecture. In other examples, PE router 10B may be configured in a variety of ways. In one example, some of the functionally of control unit 82 may be distributed within IFCs 88. In another example, control unit 82 may comprise a plurality of packet forwarding engines operated as slave routers.

Control unit 82 may be implemented solely in software, or hardware, or may be implemented as a combination of software, hardware, or firmware. For example, control unit 82 may include one or more processors which execute software instructions. In that case, the various software modules of control unit 82 may comprise executable instructions stored on a computer-readable medium, such as computer memory or hard disk.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Figure 4:
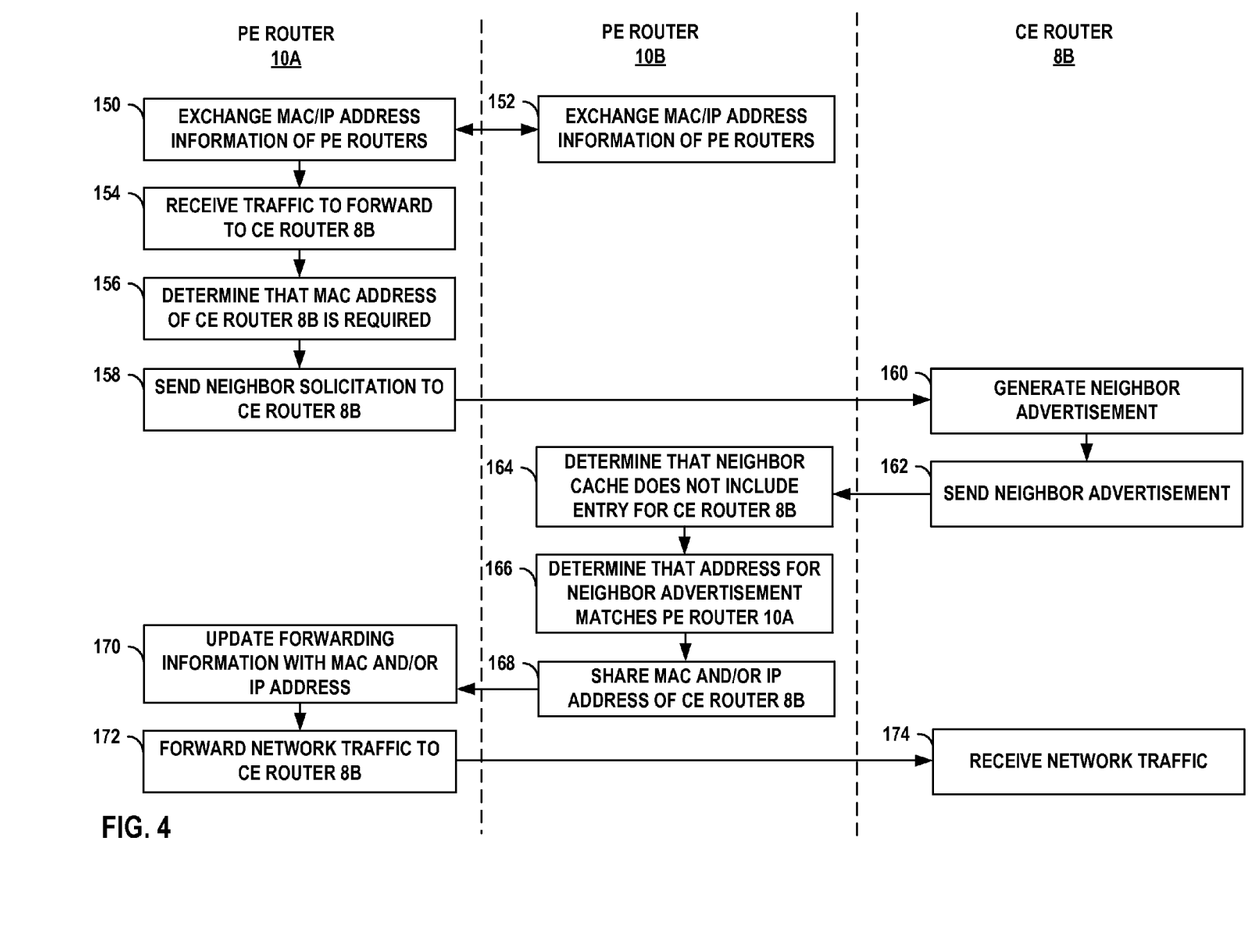
FIG. 4 is a flowchart illustrating example operations of multiple network devices in accordance with techniques of the disclosure.

FIG. 4 is a flowchart illustrating example operations of multiple network devices in accordance with techniques of the disclosure. Example operations in accordance with techniques of the disclosure are illustrated for example purposes with respect to PE routers 10A-10B of FIGS. 1 and 3.

As shown in FIG. 4, the PE routers, e.g., PE routers 10A and 10B, may, at initial configuration and startup, exchange MAC and IP addresses using Ethernet AD and/or Ethernet Segment routes. For instance, each of PE routers 10A and 10B may exchange Ethernet AD and/or Ethernet Segment routes with one another (150, 152). Each of PE routers 10A and 10B may store the MAC and/or IP address information included in the routes within forwarding information of the respective router. PE router 10A may receive network traffic to forward to CE router 8B (154). Based on performing a lookup for the destination MAC address of the network traffic, PE router 10A may determine that it needs to acquire the MAC address for CE router 8B because PE router 10A does not presently have the MAC address for CE router 8B (156). PE router 10A may send the neighbor solicitation to CE router 8B, which is received by CE router 8B (158).

CE router 8B generates a neighborhood advertisement in response to the neighbor solicitation from PE router 10A (160), but sends the advertisement to PE router 10B based on a load balancing algorithm for EVPN active-active mode (162). PE router 10B may determine that its neighbor cache does not include a neighbor cache entry for a neighbor solicitation from CE router 8B (164). Based on this determination and rather than discarding the neighbor advertisement from CE router 8B, PE router 10B may determine whether the destination MAC address and/or IP address for the neighbor advertisement packet matches a MAC and/or IP address of PE router 10A that was sent by PE router 10A to PE router 10B at initial configuration and startup. PE router 10B may determine, for instance, that the MAC and IP address for the neighbor advertisement packet matches the MAC and IP address of PE router 10A that was sent by PE router 10A to PE router 10B at initial configuration and startup (166).

In some examples, based on the determination that MAC and IP addresses match, PE router 10B may store the MAC and IP address information for CE router 8B in the forwarding and/or routing information of PE router 10B if PE router 10B did not previously store the MAC and IP address for CE router 8B. PE router 8B may share the MAC and/or IP address of CE router 8B with PE router 10A (168). For instance, PE router 8B may send the MAC and/or IP address information using an EVPN MAC route message or via BGP-EVPN NLRI. PE router 10A may receive the message from PE router 10B that includes the MAC and/or IP address for CE router 8B, and update PE router 10A's forwarding information (170). Because PE router 10A now has the MAC and IP address information for CE router 8B, PE router 10A may send network traffic to CE router 8B (172). CE router 8B may receive the network traffic and forward it accordingly (174).

Figure 5:
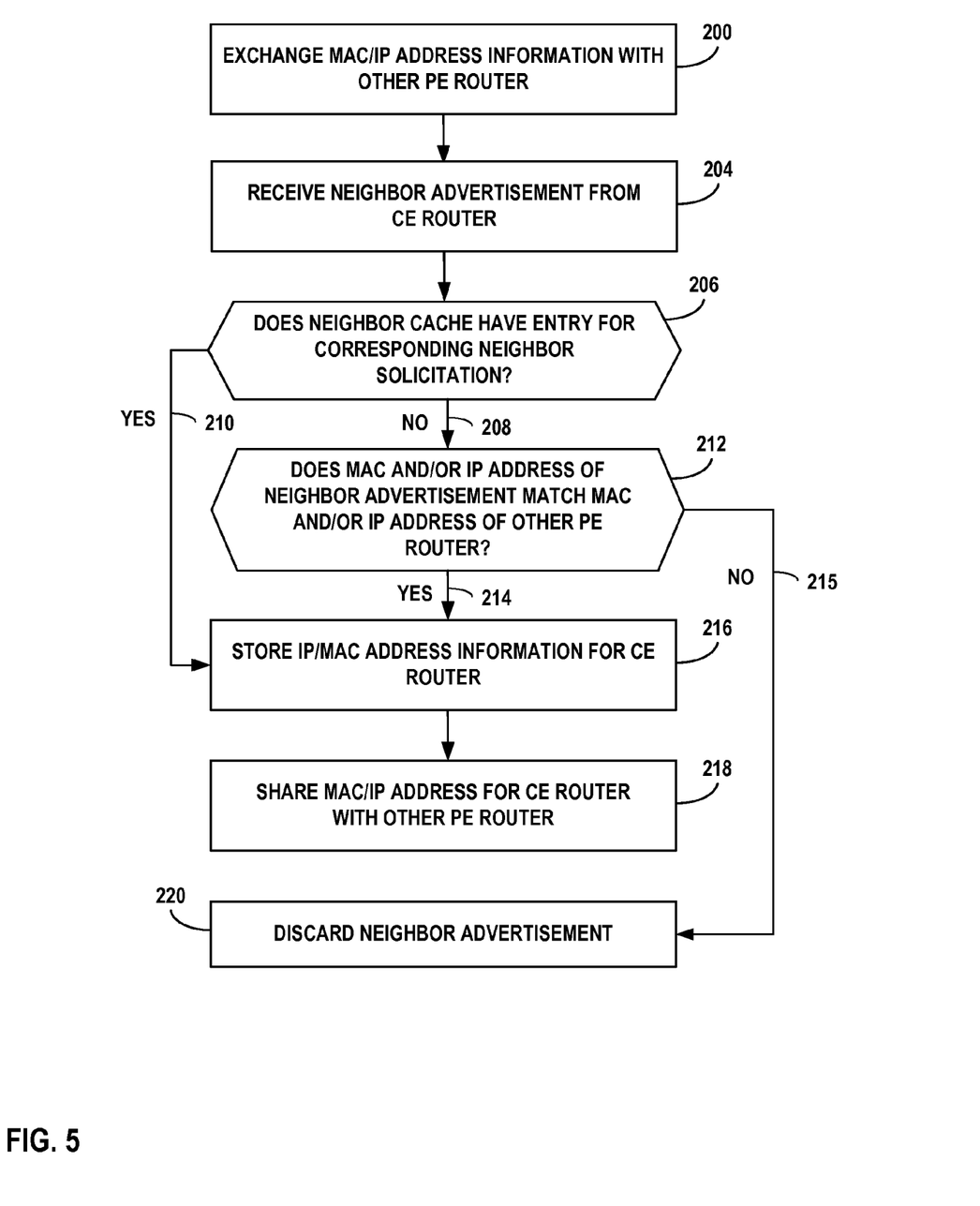
FIG. 5 is a flowchart illustrating example operations of a network device in accordance with techniques of the disclosure.

FIG. 5 is a flowchart illustrating example operations of a network device in accordance with techniques of the disclosure. Example operations in accordance with techniques of the disclosure are illustrated for example purposes with respect to PE router 10B of FIGS. 1 and 3.

As shown in FIG. 5, PE router 10B, may, at initial configuration and startup, exchange MAC and IP addresses using Ethernet AD and/or Ethernet Segment routes with other PE routers such as PE routers 10B-10C. For instance, PE router 10B may exchange Ethernet AD and/or Ethernet Segment routes with PE routers 10A and 10C (200). PE router 10B may store the MAC and/or IP address information included in the routes for PE routers 10A and 10C within forwarding information of PE router 10B. PE router 10A may receive network traffic to forward to CE router 8B (154). PE router 10A, to learn the MAC address of CE router 8B, may send a neighbor solicitation to CE router 8B. CE router 8B generates a neighborhood advertisement in response to the neighbor solicitation from PE router 10A, but sends the advertisement to PE router 10B based on a load balancing algorithm for EVPN active-active mode. PE router 10B may receive the neighbor advertisement (204).

PE router 10B may determine whether its neighbor cache does includes a neighbor cache entry for a neighbor solicitation from CE router 8B (206). PE router 10B may be configured such that if it previously sent a neighbor solicitation, it may store the MAC and/or IP address information from the corresponding neighbor advertisement in the forwarding information of PE router 10B. In some examples, information included in the neighbor advertisement is not discarded by PE router 10B until at least after determining whether the neighbor cache includes a neighbor cache entry that corresponds to the neighbor advertisement.

If, however, PE router 10B does not have a neighbor cache entry in its neighbor cache for CE router 8B, PE router 10B may determine whether the destination MAC address and/or IP address for the neighbor advertisement packet matches a MAC and/or IP address of PE router 10A that was sent by PE router 10A to PE router 10B at initial configuration and startup (212). In some examples, information included in the neighbor advertisement is not discarded by PE router 10B until at least after determining whether the one or more destination addresses of the IPv6 neighbor advertisement match the one or more addresses of the second PE router.

If there is not a match (215), PE router may discard the neighbor advertisement (220). If however, PE router 10B determines that the MAC and IP address for the neighbor advertisement packet matches the MAC and IP address of PE router 10A that was sent by PE router 10A to PE router 10B at initial configuration and startup (214), then PE router 10B may store the MAC and/or IP address information from the corresponding neighbor advertisement in the forwarding information of PE router 10B (216).

In the example of FIG. 5, based on the determination that MAC and IP addresses match, PE router 8B may share the MAC and/or IP address of CE router 8B with PE router 10A (218). For instance, PE router 8B may send the MAC and/or IP address information using an EVPN MAC route message or via BGP-EVPN NLRI. PE router 10A may receive the message from PE router 10B that includes the MAC and/or IP address for CE router 8B, and update PE router 10A's forwarding information. PE router 10A may use the MAC and IP address information for CE router 8B to forward network traffic to CE router 8B.

In some examples, in EVPN, a PE device advertises MAC+IP information of an attached host using BGP. This information may be used to do L3 routing on the remote PE, where remote PE routes packet destined to CE host IP and also includes the host MAC in packet and sends to the local PE. The local PE may then send the packet to CE by looking up the destination MAC in the packet (which is of CE host). The EVPN type 2 route that is advertised from one PE to other have both MAC and IP fields. IP field is optional. With EVPN IRB for Layer 3 routing purpose, the techniques may send MAC+IP and these route are called MAC+IP route. For layer 2 i.e. with no IRB, only MAC is advertised, and the route is called MAC route. In some examples, there are never IP routes advertised by EVPN, which is how such techniques are different from pure L3 routing protocols.

Various embodiments of the invention have been described. These and other embodiments are within the scope of the following claims.

The invention claimed is:

1. A method comprising:
receiving, by a first provider edge (PE) router and from a second PE router when establishing an Ethernet Virtual Private Network (EVPN) with the first PE router and the second PE router, a layer two (L2) address and an Internet Protocol version 6 (IPv6) address associated with a bridging interface of the second PE router for use with the EVPN;
receiving, by the first PE router and from a CE router that is locally coupled to the first PE router, an IPv6 neighbor advertisement from the CE router that is sent by the CE router in response to an IPv6 neighbor solicitation from the second PE router that requested a MAC address of the CE router, wherein the CE router is multi-homed to the first and second PE routers, and wherein the IPv6 neighbor advertisement has been forwarded to the first PE router by the CE router based at least in part on the CE router load balancing network traffic in an Ethernet Segment that includes the first and second PE routers;
in response to receiving the IPv6 neighbor advertisement, determining, by the first PE router, whether an L2 destination addresses of the IPv6 neighbor advertisement match the L2 address of the bridging interface of the second PE router; and
in response to determining a match, sending, by the first PE router and to the second PE router, an EVPN route advertisement specifying at least the MAC address of the CE router.

2. The method of claim 1, wherein information included in the neighbor advertisement is not discarded until at least after determining whether the L2 destination address of the IPv6 neighbor advertisement matches the L2 address of the second PE router.

3. The method of claim 1, wherein information included in the neighbor advertisement is not discarded until at least after determining whether a neighbor cache includes a neighbor cache entry that corresponds to the neighbor advertisement.

4. The method of claim 1,
wherein the first PE and second PE routers are configured in EVPN active-active mode.

5. The method of claim 1,
wherein the first PE router and the first CE router are included in a first subnet,
wherein the second PE router is directly coupled to a second CE router, and the second PE router and second CE router are included in a second subnet that is different than the first subnet,
wherein the first PE router received the neighbor solicitation destined for the first CE router from the second PE router prior to the first CE router receiving the neighbor solicitation, and
wherein the first PE router received the neighbor advertisement destined for the second PE router from the first CE router.

6. The method of claim 1,
wherein the bridging interface of the second PE router corresponds to an Integrated Routing and Bridging (IRB) interface, and
wherein determining whether the L2 destination addresses of the IPv6 neighbor advertisement match the L2 address of the bridging interface of the second PE router comprises determining whether a destination MAC address of the IPv6 neighbor advertisement matches a MAC addresses of the IRB interface of the second PE router.

7. The method of claim 1, further comprising:
determining, by the first PE router, whether a neighbor cache maintained by the first PE router includes a neighbor entry for the first CE router; and
in response to determining that the neighbor cache does not include a neighbor entry for the first CE router, storing at least the MAC address of the first CE router in the neighbor cache.

8. A first provider edge (PE) router comprising one or more processors, wherein the one or more processors are configured to:
receive, from a second PE router when establishing an Ethernet Virtual Private Network (EVPN) with the first PE router and the second PE router, a layer two (L2) address and an Internet Protocol version 6 (IPv6) address associated with a bridging interface of the second PE router for use with the EVPN;
receive, from a CE router that is locally coupled to the first PE router, an IPv6 neighbor advertisement from the CE router that is sent by the CE router in response to an IPv6 neighbor solicitation from the second PE router that requested a MAC address of the CE router, wherein the CE router is multi-homed to the first and second PE routers, and wherein the IPv6 neighbor advertisement has been forwarded to the first PE router by the CE router based at least in part on the CE router load balancing network traffic in an Ethernet Segment that includes the first and second PE routers;

in response to receiving the IPv6 neighbor advertisement, determine whether an L2 destination addresses of the IPv6 neighbor advertisement match the L2 address of the bridging interface second PE router; and in response to determining a match, send, to the second PE router, an EVPN route advertisement specifying at least the MAC address of the CE router.

9. The first PE router of claim 8, wherein information included in the neighbor advertisement is not discarded until at least after determining whether the L2 destination address of the IPv6 neighbor advertisement matches the L2 address of the second PE router.

10. The first PE router of claim 8, wherein information included in the neighbor advertisement is not discarded until at least after determining whether a neighbor cache includes a neighbor cache entry that corresponds to the neighbor advertisement.

11. The first PE router of claim 8, wherein the first PE and second PE routers are configured in EVPN active-active mode.

12. The first PE router of claim 8, wherein the first PE router and the first CE router are included in a first subnet,
wherein the second PE router is directly coupled to a second CE router, and the second PE router and second CE router are included in a second subnet that is different than the first subnet,
wherein the first PE router received the neighbor solicitation destined for the first CE router from the second PE router prior to the first CE router receiving the neighbor solicitation, and
wherein the first PE router received the neighbor advertisement destined for the second PE router from the first CE router.

13. The first PE router of claim 8, wherein the bridging interface of the second PE router corresponds to an Integrated Routing and Bridging (IRB) interface, and
wherein, to determine whether the L2 destination addresses of the IPv6 neighbor advertisement match the L2 address of the bridging interface of the second PE router, the one or more processors further configured to determine whether a destination MAC address of the IPv6 neighbor advertisement matches a MAC addresses of the IRB interface of the second PE router.

14. The first PE router of claim 8, wherein the one or more processors further configured to:
determine whether a neighbor cache maintained by the first PE router includes a neighbor entry for the first CE router; and
in response to determining that the neighbor cache does not include a neighbor entry for the first CE router, store at least the MAC address of the first CE router in the neighbor cache.

15. A non-transitory computer-readable medium comprising instructions for causing at least one programmable processor of a first provider edge (PE) router to:
receive, from a second PE router when establishing an Ethernet Virtual Private Network (EVPN) with the first PE router and the second PE router, a layer two (L2) address and an Internet Protocol version 6 (IPv6) address associated with a bridging interface of the second PE router for use with the EVPN;
receive, from a CE router that is locally coupled to the first PE router, an IPv6 neighbor advertisement from the CE router that is sent by the CE router in response to an IPv6 neighbor solicitation from the second PE router that requested a MAC address of the CE router, wherein the CE router is multi-homed to the first and second PE routers, and wherein the IPv6 neighbor advertisement has been forwarded to the first PE router by the CE router based at least in part on the CE router load balancing network traffic in an Ethernet Segment that includes the first and second PE routers;
in response to receiving the IPv6 neighbor advertisement, determine whether an L2 destination addresses of the IPv6 neighbor advertisement match the L2 address of the bridging interface second PE router; and
in response to determining a match, send, to the second PE router, an EVPN route advertisement specifying at least the MAC address of the CE router.

16. The non-transitory computer-readable medium of claim 15, wherein information included in the neighbor advertisement is not discarded until at least after determining whether the L2 destination address of the IPv6 neighbor advertisement matches the L2 address of the second PE router.

17. The non-transitory computer-readable medium of claim 15, wherein information included in the neighbor advertisement is not discarded until at least after determining whether a neighbor cache includes a neighbor cache entry that corresponds to the neighbor advertisement.

18. The non-transitory computer-readable medium of claim 15, wherein the first PE and second PE routers are configured in EVPN active-active mode.

19. The non-transitory computer-readable medium of claim 15, wherein the first PE router and the first CE router are included in a first subnet,
wherein the second PE router is directly coupled to a second CE router, and the second PE router and second CE router are included in a second subnet that is different than the first subnet,
wherein the first PE router received the neighbor solicitation destined for the first CE router from the second PE router prior to the first CE router receiving the neighbor solicitation, and
wherein the first PE router received the neighbor advertisement destined for the second PE router from the first CE router.

20. The non-transitory computer-readable medium of claim 15, wherein the bridging interface of the second PE router corresponds to an Integrated Routing and Bridging (IRB) interface, wherein the computer-readable medium comprises instructions for causing at least one programmable processor of the first provider edge (PE) router to:
determine whether a destination MAC address of the IPv6 neighbor advertisement matches a MAC addresses of the IRB interface of the second PE router.

* * * * *